United States Patent [19]

Gonska

[11] Patent Number: 4,470,387
[45] Date of Patent: Sep. 11, 1984

[54] MASS BALANCING ARRANGEMENT FOR A RECIPROCATING-PISTON ENGINE

[75] Inventor: Walter Gonska, Wasbüttel, Fed. Rep. of Germany

[73] Assignee: Volkswagenwerk Aktiengesellschaft, Wolfsburg, Fed. Rep. of Germany

[21] Appl. No.: 413,778

[22] Filed: Sep. 1, 1982

[30] Foreign Application Priority Data

Sep. 24, 1981 [DE] Fed. Rep. of Germany ....... 3137934

[51] Int. Cl.³ .............................................. F02B 75/06
[52] U.S. Cl. .............................. 123/192 B; 123/192 R; 74/604
[58] Field of Search ............. 74/604, 603; 123/192 R, 123/192 B, 197 AC, 197 AB

[56] References Cited

U.S. PATENT DOCUMENTS

| | | | |
|---|---|---|---|
| 3,563,222 | 2/1971 | Ishida | 123/192 |
| 3,744,342 | 7/1973 | Kinoshita | 123/192 B |
| 4,174,698 | 11/1979 | Dupin | 123/192 R |
| 4,237,741 | 12/1980 | Huf et al. | 74/604 |

FOREIGN PATENT DOCUMENTS 2423134 11/1975 Fed. Rep. of Germany.
3033803 4/1982 Fed. Rep. of Germany.
2065781 7/1981 United Kingdom ................. 74/603

Primary Examiner—Ira S. Lazarus
Assistant Examiner—R. S. Bailey
Attorney, Agent, or Firm—Brumbaugh, Graves, Donohue & Raymond

[57] ABSTRACT

In a reciprocating-piston engine including operating cylinders, a piston associated with each cylinder, a crankshaft with crankpins, and piston rods for connecting the pistons to the crankpins, a mass balancing arrangement has a balancing mass connecting rod connected to the crankshaft, a balancing mass connected to the balancing mass connecting rod, and a rocker arm for guiding the balancing mass with one end connected to the balancing mass connecting rod and with the other end connected to an extension of a piston rod beyond its connection to a crankpin. A rocker arm or a pair of rocker arms could be used with each balancing mass, depending upon the arrangement of the cylinders.

2 Claims, 2 Drawing Figures

MASS BALANCING ARRANGEMENT FOR A RECIPROCATING-PISTON ENGINE

BACKGROUND OF THE INVENTION

The invention concerns an arrangement for mass balancing in a reciprocating-piston crankshaft engine. Arrangements are known for mass balancing in a reciprocating-piston crankshaft engine in which a balancing mass is provided and is connected to move in phase opposition to the operating pistons, i.e., when the working pistons are at their lowest point the balance mass is at its highest point and vice versa. In the arrangements disclosed in DE-OS 24 23 143 and DE-OS 30 33 803, a balancing mass connecting rod is driven in opposite phase to the pistons. The balancing mass connecting rod is guided by a rocker arm pivotably connected to the balancing mass connecting rod. In these mass balancing arrangements, the rocker arms swivel on the engine housing. When the engine is in operation, the balancing mass follows a circular path, whose radius will be a function of the length of the rocker arm.

BRIEF SUMMARY OF THE INVENTION

The present invention is a mass balancing arrangement for a reciprocating-piston crankshaft engine that is integrated as much as possible with the driving mechanism of the engine and in which articulation on the engine housing can be eliminated.

More particularly, the invention is an arrangement for mass balancing in a reciprocating-piston engine, which engine includes at least one operating cylinder, a piston associated with each cylinder, and a crankshaft with at least one crankpin, wherein a piston rod is pivotably connected between a piston and a crankpin of the crankshaft, the piston rod has an extension beyond the point of connection to the crankshaft, i.e., beyond the crankpin, a balancing mass is included, a balancing mass connecting rod is connected between the balancing mass and the crankshaft, and a rocker arm for guiding the balancing mass is rotatably connected between the balancing mass connecting rod and the extension of the piston rod.

In reciprocating piston engines, imbalance occurs both from displacement of the piston rod and from changes in angular orientation thereof. During up and down movement of the piston, the piston rod pivots about its center of gravity. In conventional arrangements, the crankpin is attached to the piston rod at a distance from the center of gravity of the piston rod, the center of gravity lying between the piston and crankpin. The pivoting of the piston rod about its center of gravity thereby imparts an imbalance force to the crankpin which is transmitted to the crankshaft. Also, during the piston cycle the center of gravity of the piston rod travels in a curved path, again causing an imbalance. As is known, extending the piston rod beyond the crankpin shifts the center of gravity toward the crankpin. By shifting the piston rod center of gravity to the vicinity of the crankpin, the unbalance force on the crankpin, caused by the pivoting oscillation of the piston rod about its center of gravity, is reduced. The rotating mass of the piston rod, which by extending the piston rod is concentrated on the crankpin and rotates in a circular path about the crankshaft axis, can also be balanced by providing a countermass on the crankshaft. Theoretically, it is possible in this manner to achieve a complete balancing of the forces produced by the oscillating masses. However, to do so would require strengthened crankpin bearings and would also produce a considerable increase of the sliding path forces exerted by the pistons on the cylinder sidewalls. For such reasons, a complete mass balancing effected in this matter is not desirable.

In a mass balancing arrangement according to the invention, only part of the forces originating with the oscillating mass are balanced in a piston rod-crankshaft counterweight arrangement. Preferably, the mass of the piston rod extension, i.e., the portion extending beyond the point of connection to the crankpin, is sufficient to shift the center of gravity of the piston rod to the vicinity of the crankpin. As a result, the pivoting movement of the piston rod mass is balanced about the crankpin. Also, a crankshaft counterweight is provided to counterbalance the mass of the extension portion of the piston rod. While the counterweight compensates for the increase in mass produced by the extension portion, it does not counterbalance the main portion of the piston rod.

The remaining portion of the oscillating mass to be balanced is balanced by a balancing mass which is driven by the crankshaft through a balancing mass connecting rod. A rocker arm is used for guiding the balancing mass. One end of the rocker arm is rotatably connected to the extension of the piston rod and the other end of the rocker arm is rotatably connected to the balancing mass connecting rod. In this mass balancing arrangement, the entire balancing drive is integrated with the crankshaft drive and does not require any additional connections to the engine housing.

A mass balancing arrangement in accordance with the invention is especially suitable for multicylinder reciprocating-piston internal combustion engines that have cylinder groups with two cylinders in each group, where both pistons in each group have a like phase position. In such an engine, a balancing mass is associated with each cylinder group. The balancing mass is driven by a balancing connecting rod that is connected to the crankshaft at a point located between the points on the crankshaft where the piston rods are connected to the crankpins. In addition, the balancing mass is connected to the working connecting rods by rocker arms, which are located symmetrically on either side of the balancing mass, where each rocker arm is connected to a piston rod which extends beyond its connection to the crankpin.

DESCRIPTION OF THE PREFERRED EMBODIMENTS

Figure 2:
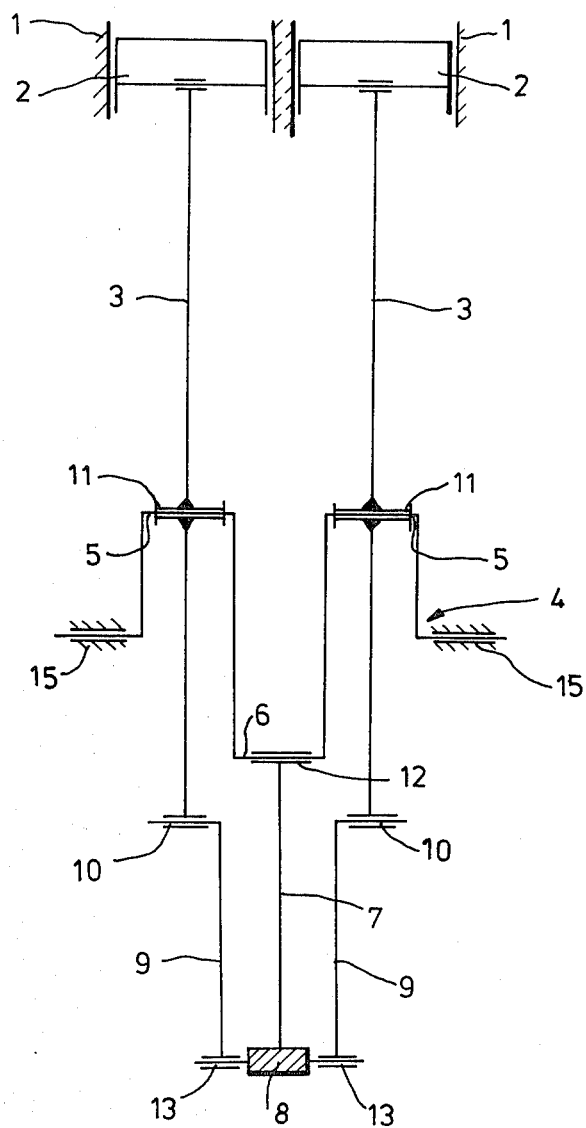
FIG. 2 is a side view, in schematic form, of two pistons with the same phase position in a reciprocating-piston crankshaft engine having a mass balancing arrangement in accordance with the invention.

In FIG. 2, a mass balancing arrangement in accordance with the invention is applied to a two-cylinder, four-stroke internal combustion engine having operating pistons 2 that oscillate in operating cylinders 1. The piston rods 3 connect the operating pistons 2 and the crankpins 5 of the crankshaft 4. A third, intermediate crankpin 6 is located between the two crankpins 5 associated with the operating cylinders. A balancing mass connecting rod 7 is articulated on the third, intermediate crankpin 6. The balancing mass connecting rod 7 drives the balancing mass 8. The balancing mass 8 is concentrated at the end of the balancing mass connecting rod 7. At this end of the balancing mass connecting rod 7, two rocker arms 9 are rotatably connected. The other ends of the rocker arms 9 are rotatably connected on extensions of the piston rods 3, these extensions being the portions of the piston rods 3 that go beyond the points of connection, indicated by reference numerals 11, to the crankpins 5 of the crankshaft 4.

Reference numerals 10 indicate the points of connection of the rocker arms 9 to the piston rods. Reference numerals 13 indicate the points of connection of the rocker arms 9 to the balancing mass connecting rod 7. Reference numeral 12 indicates the point of connection of the balancing mass connecting rod 7 to the crankpin 6 of the crankshaft 4. Reference numerals 15 signify the main bearings for the crankshaft 4.

As indicated above, the extension of the piston rods 3 beyond the points of connection to the crankpins 5 results in a reduction of the oscillating mass to the balanced. This reduction can be enhanced by concentrating mass at the ends of the extensions of the piston rods 3. The resultant increase in mass, rotating around the crankshaft axis, can be balanced by corresponding counterweights, e.g., by mass concentration on the crankpin 6. However, a complete reduction of the oscillating forces in this manner is avoided since the sliding forces that would result would be increased considerably. In order to reduce the oscillating mass to be balanced without increasing the sliding path forces, the oscillating mass is balanced by using a balancing mass 8, which can be obtained by concentrating mass at the end of the balancing connecting rod 7 that is farthest from the crankshaft 4. The rocker arms 9 are rotatably connected to the balancing connecting rod 7 at approximately the center of gravity of the balancing mass 8. The rocker arms 9 are also rotatably connected to the free end of the working connecting rods 3, in lieu of the engine housing. Consequently, the entire balancing mechanism is integrated with the crankshaft drive.

Figure 1:
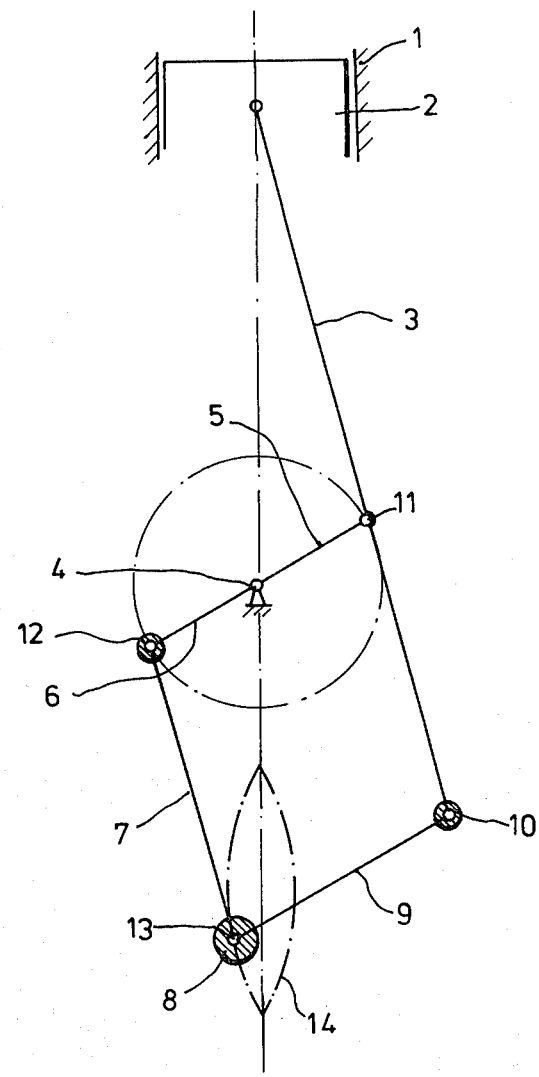
FIG. 1 is an end view, in schematic form, showing a piston in a reciprocating-piston crankshaft engine having a mass balancing arrangement in accordance with the invention.

In FIG. 1, reference numeral 14 designates the path of the balancing mass 8, which consists of two curves spaced symmetrically with respect to the center of the engine.

In FIG. 2, a mass balancing arrangement in accordance with the invention is shown for a two-cylinder engine. A mass balancing arrangement in accordance with the invention could also be used in a single-cylinder or a multicylinder engine. In some multicylinder engines the use of a mass balancing arrangement in accordance with the invention would be rendered easier because of symmetries in the engine. The invention is especially useful in a multicylinder engine that has several groups of pistons with two pistons with the same phase position in each group. The two pistons in each group can be balanced in accordance with the principle of the invention shown in FIG. 2. If each group is so balanced, the entire engine is also balanced.

In such a multicylinder engine, the balancing arrangements for the groups of cylinder pairs can be arranged such that the transverse forces generated by movement of the individual balancing masses (i.e., movement transverse to the crankshaft axis) are compensated by the other balancing masses. Additionally, the moments generated by the sliding path forces of the respective pistons balance one another.

In another embodiment of the invention, only one rocker arm 9 would be used instead of the two shown in FIG. 2. The rocker arm would be rotatably connected to an extension of one piston rod.

The foregoing represent the preferred embodiments of the invention. Variations of and modifications to the foregoing embodiments will be apparent to persons skilled in the art without departing from the inventive concepts disclosed herein. All such modifications and variations are intended to be within the scope of the invention as defined in the following claims.

I claim:

1. A reciprocating-piston engine comprising at least one operating cylinder, a piston associated with said cylinder able to oscillate in said cylinder, a crankshaft with at least two crankpins, and an arrangement for mass balancing said engine comprising:
   a piston rod pivotably connected between said piston and a connection point to a first crankpin on said crankshaft and having a portion extending beyond said connection point;
   at least one balancing mass;
   a balancing mass connecting rod pivotably connected between a second crankpin on said crankshaft and said balancing mass such that said mass is driven by said crankshaft in opposite phase relation to said piston; and
   a rocker arm, for guiding said balancing mass, pivotably connecting between said balancing mass connecting rod and the extension portion of said piston rod, whereby the balancing mass is guided over a curved path extending essentially in the direction of movement of said operating piston.

2. An engine in accordance with claim 1, comprising:
   a plurality of cylinders, each having an associated piston and a piston rod pivotably connected between the piston and a connection point to a crankpin on said crankshaft, each said piston rod having an extension portion, said cylinders being arranged in groups of two cylinders, each group having pistons with the same phase position;
   a balancing mass associated with each said group;
   a balancing mass connecting rod associated with each said group and pivotably connected between the balancing mass and said crankshaft at a point between said connection points for the piston rods of said group; and
   a pair of rocker arms associated with each said group, each pivotably connected between said balancing mass connecting rod and one of the extension portions of the piston rods of said group, wherein said rocker arms are located symmetrically with respect to said balancing mass.

* * * * *